United States Patent [19]
Able et al.

[11] Patent Number: 5,474,105
[45] Date of Patent: Dec. 12, 1995

[54] OVERRUN CONTROL DEVICE

[75] Inventors: Stephen D. Able; Raymond D. Carter, both of Bryan, Ohio

[73] Assignee: The Aro Corporation, Bryan, Ohio

[21] Appl. No.: 220,645

[22] Filed: Mar. 31, 1994

[51] Int. Cl.$^6$ ............................................ F16K 17/24
[52] U.S. Cl. ............................ 137/462; 137/498; 137/503; 137/504
[58] Field of Search .................................. 137/462, 498, 137/503, 504

[56] References Cited

U.S. PATENT DOCUMENTS

| | | | |
|---|---|---|---|
| 3,060,959 | 10/1962 | Foster | 137/498 |
| 3,561,471 | 2/1971 | Sands | 137/462 X |
| 3,741,241 | 6/1973 | Jackson | 137/504 |
| 4,465,093 | 8/1984 | Gold | 137/462 X |

*Primary Examiner*—Robert G. Nilson
*Attorney, Agent, or Firm*—Walter C. Vliet

[57] ABSTRACT

A pneumatic fluid flow limiting device which is pressure compensated and resets automatically when the pneumatic fluid driven device is shut off. Pressure compensation is accomplished by a vented differential diameter chamber and reset is accomplished by a bypass orifice in a spool valve which further may be variable in flow to accommodate different flow requirements for tool operation.

6 Claims, 1 Drawing Sheet

OVERRUN CONTROL DEVICE

BACKGROUND OF THE INVENTION

This invention relates generally to control devices and more particularly to a pneumatic fluid flow limiting device for preventing overrun of a pneumatic fluid driven device such as a power tool or pump, for example, piston pumps suffer damage and use excessive air when they are run dry (the pumped fluid is no longer available at the inlet). If permitted to continue for an extended period of time, the packings will overheat and subsequently leak after inlet (suction) supply is restored.

Prior art control devices are known which will shut off the air supply to the pump when the air requirement exceeds its setpoint. The difficulty with the known prior art is that it must be adjusted to accommodate varying conditions and requires adjustment when the air pressure changes. Another difficulty is that it must be manually reset after being tripped in the overrun position.

Other devices which could be used would include air logic circuits which are both costly and may require an electrical interface. One of the benefits of using air operated pumps is that they can be used in applications without using electricity for pump operation and/or control.

The foregoing illustrates limitations known to exist in present devices and methods. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention this is accomplished by providing an overrun preventing device for limiting pressure fluid flow to a pressure fluid driven device comprising a pressure fluid container having an inlet and an outlet with a passage therebetween; a piston disposed within the passage for reciprocal movement therein between a position permitting fluid flow and a position wherein the piston cooperates with a valve seat to obstruct the flow of fluid between the inlet and the outlet; the piston being urged towards the valve seat by the flow of pressure fluid against the force of a restoring means; and piston bypass means for continuously bypassing at least a portion of the fluid flow.

The foregoing and other aspects will become apparent from the following detailed description of the invention when considered in conjunction with the accompanying drawing figures.

BRIEF DESCRIPTION OF THE DRAWING FIGURES

FIG. 1 is a cross sectional view of an overrun control device according to the prior art; and FIG. 2 is a cross sectional device of an overrun control device according to the present invention.

DETAILED DESCRIPTION

Figure 1:
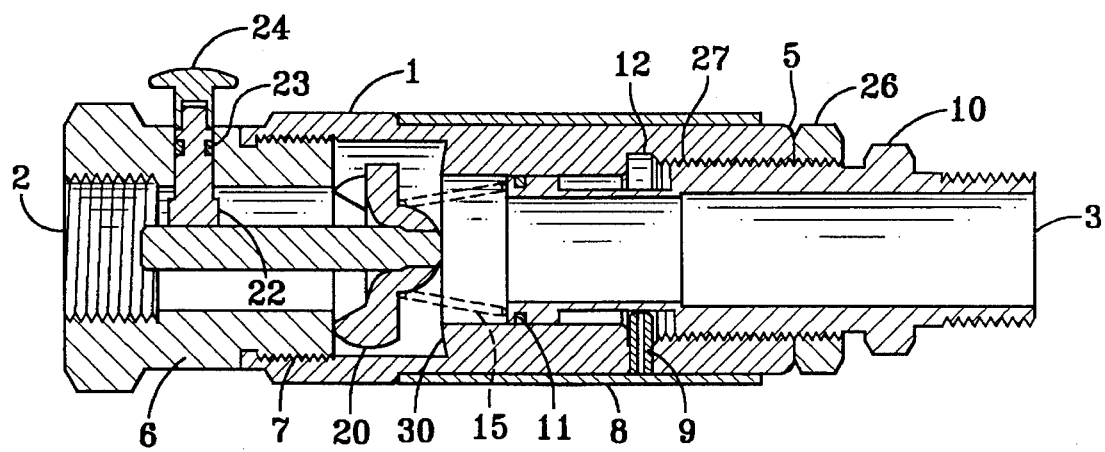

Referring to FIG. 1, an overrun preventing device according to the prior art is shown and generally indicated by the reference numeral 1. The device is generally comprised of a body 5 having an inlet 2 and an outlet 3 with a flow channel 4 generally therebetween. The inlet 2 is shown in an inlet bushing 6 which is threadingly engaged with the body 5 by means of a thread 7. The outlet 3 is contained in an outlet bushing 10 which is threadingly engaged in the body by means of thread 27 and its position is adjustable relative to the body.

The threaded position of the outlet bushing 10 is maintained by a stop nut 26 for a purpose to be later described. A valve member 20 reciprocates within the body 5 to cooperate with a valve seat 30 in the body 5. The valve member 30 permits flow through the body from the inlet to the outlet in the position shown in FIG. 1. The position shown in FIG. 1 is maintained by spring 15 applying a resilient force against the valve member 20. This force is variable based upon the position of the outlet bushing 10 relative to the body 5. An "O" ring seal 11 prevents bypass of the pressure fluid between the body 5 and the outlet bushing 10. A stop 12, which is retained by a roll pin 9, prevents the accidental withdrawal of the outlet bushing 10 during adjustment.

In operation, pressure fluid passing through the overrun protecting device 1 passes through the device in sufficient quantity to operate a pressure fluid driven device such as an air operated wrench, screwdriver, saw, pump, or the like. The flow of pressure fluid through the overrun preventing device tends to force the valve member 20 towards the right, as shown in FIG. 1, depending on the amount of pressure fluid flow. Should the flow become excessive for the given setting, as for example when the pressure fluid driven device overspeeds, or an airline breaks, the valve member is forced sufficiently to the right to cooperate with the valve seat and thereby shut off the flow of pressure fluid.

In the prior art device, once the flow was shut off, it could not be restarted until the valve member 30 became displaced from the seat. The force of the pressure fluid against the valve seat in the closed position maintained it in its closed position, even after the alternating valve for the pressure fluid driven device was released. To displace the valve member, the prior art device was provided with a valve stem 21 which could be depressed to tip the valve member 20 away from the valve seat 30 and thereby again permit operation of the pressure fluid driven device. A plunger 22 was provided to engage the stem which was sealingly engaged in the inlet bushing 6 by means of a plunger "O" ring seal 23. A plunger cap 24 was provided to aid in depressing the plunger to displace the stem 21.

Figure 2:
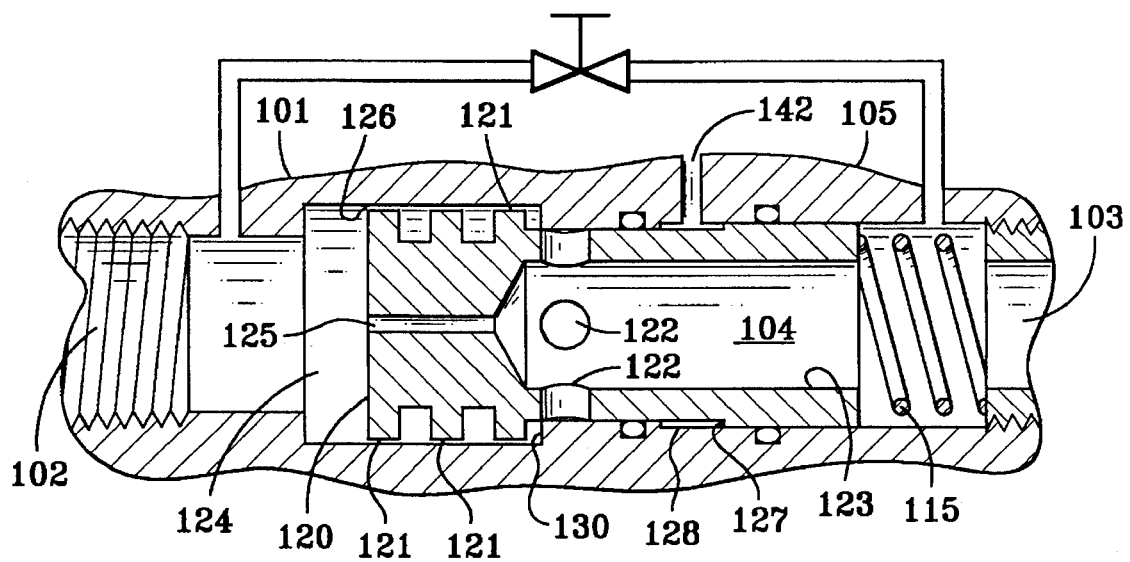

According to the present invention, an overrun preventing device is provided which may be automatically reset and is shown in FIG. 2. The device construction may be similar to the prior art except as shown in FIG. 2 and described as follows.

A body portion 105 is provided with an inlet 102 and an outlet 103 with a stepped passage 104 therebetween. One portion of the stepped passageway 104 forms a piston cylinder cavity 124. A valve piston 120 is disposed within the valve piston cavity 124 for reciprocation therein. The valve piston 120 is provided with a series of circumferential grooves, forming rings 121, which in turn cooperate in near proximity with the valve piston chamber 124 to form a flow permitting controlled flow labyrinth pressure differential device. The valve piston 120 is further provided with an attached hollow skirt portion 123 which has a smaller diameter upstream portion and an expanded downstream portion joined to form a land 127. Both the upstream portion and the downstream portion of the skirt 123 are in sliding sealing contact with the walls of the body.

The difference in skirt diameter forms a circumferential chamber 128 which is vented to atmosphere by means of vent 142. It is this difference in diameter and the venting which creates a pressure compensated restoring force to the valve piston 120 which tends to force it to the left, as shown in FIG. 2. The flow or pressure fluid through the overrun protection device past the rings 121 create a pressure differential which tends to force the valve piston 120 to the right as shown in FIG. 2. Spring 115 also produces a restoring force to the left, as shown in FIG. 2. When the pressure flow increases to the maximum permissible level, the flow of pressure fluid past the piston is shut off, as shown in FIG. 2.

It should be appreciated by one skilled in the art that when the piston is to the left, the pressure fluid can flow through ports 122 (of which four are provided in the preferred embodiment described). It should be appreciated that the edge of land 130 shuts off the flow through the ports 122 when the valve piston 120 is displaced to the right, as shown in FIG. 2. This shuts off the major portion of the motive pressure fluid flowing through the overrun protection device.

To provide automatic reset of the overrun control device, an orifice 125 is provided through the head of the valve piston which permits a small control flow of pressure fluid past the piston 120 which permits the balance of pressure fluid on both sides of the piston once the pressure fluid driven device is shut off. Orifice 125 as shown is a fixed orifice. It may also be desirable to provide a variable bleed or bypass flow in addition to the fixed orifice or in place thereof.

For this purpose a bypass line 140 is shown in FIG. 2 having a control valve 141 in the line. The bypass line 140 permits a controlled variable flow of pressure fluid from the inlet side of the overrun protecting device to the outlet side as shown. This allows the user to easily adjust the flow rate at which the device trips or shuts off. The piston diameters may also be varied to adjust the setpoint and the permissible maximum flow rate.

In operation, the improved overrun protecting device, according to the present invention, is pressure compensated by virtue of the different skirt diameter, as previously explained, and adjustable for bypass flow rates, which permit its use on a wide assortment of tools with varying flow requirements, simply by changing the orifice size or providing a variable bypass orifice as described above.

It should now be appreciated by one skilled in the art that the pressure drop across the labyrinth rings produce a force on the valve piston 120 tending to displace the piston toward its shut off position to the right as shown in FIG. 2. A pressure compensated means for opposing that force is produced by the difference in the piston diameter about land 127 in cooperation with the vented chamber 128. Spring 115 produces a nonpressure compensated opposing force which in combination with the pressure compensated means urges the piston 120 to its open position permitting flow of pressure fluid through the ports 122. Spring 115 also restores the piston to the open position (to the left) when the pressure fluid source is shut off. The spring force of spring 115 is variable based on the position of the outlet bushing 103 relative to the body 105 inthe same manner as previously described for the FIG. 1 assembly.

Having described my invention in terms of a preferred embodiment, we do not wish to be limited in the scope of the invention as will now be understood by one skilled in the art except as claimed.

What is claimed is:

1. An overrun preventing device for limiting pressure fluid flow to a pressure fluid driven device comprising:

a pressure fluid container having an inlet and an outlet with a passage therebetween;

a piston disposed within said passage for reciprocal movement therein between a position permitting fluid flow and a position wherein said piston cooperates with a valve seat to obstruct the flow of fluid between said inlet and said outlet;

said piston being urged towards said valve seat by said flow of pressure fluid against the force of a variable restoring means;

piston bypass means for continuously bypassing at least a portion of said fluid flow;

means for increasing the pressure fluid urging force on said piston; and said means for increasing the urging force comprising a labyrinth formed on the periphery of said piston.

2. An overrun preventing device according to claim 1, wherein: the force of said restoring means is proportional to the pressure fluid operating pressure.

3. An overrun preventing device according to claim 1, wherein: said piston bypass means comprises an orifice through said piston.

4. An overrun preventing device according to claim 1, wherein: said piston bypass means is a variable bypass means.

5. A overrun preventing device according to claim 1, wherein: said restoring means comprises a spring.

6. An overrun preventing device according to claim 5, wherein: said spring is an adjustable spring.

* * * * *